Figure 1:
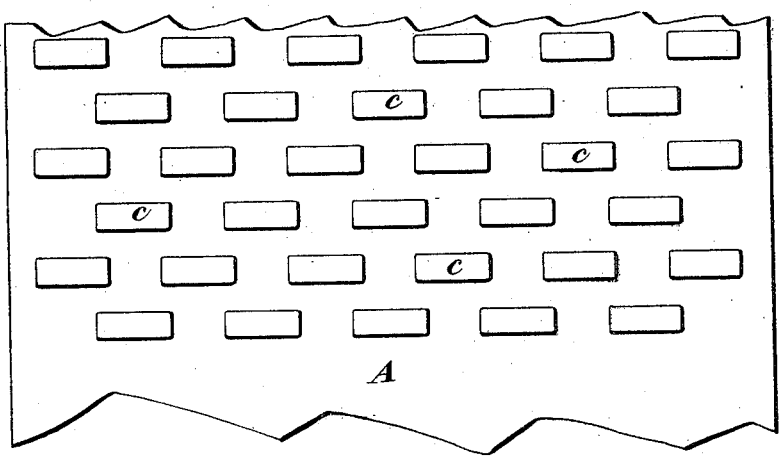

No. 652,447. Patented June 26, 1900.
M. SWENSON.
COMPRESSION BELT FOR COTTON PRESSES.
(Application filed Nov. 21, 1898.)

(No Model.)

Witnesses.

Inventor.
Magnus Swenson
by Frank L. Dyer
Attorney.

UNITED STATES PATENT OFFICE.

MAGNUS SWENSON, OF CHICAGO, ILLINOIS, ASSIGNOR TO THE AMERICAN COTTON COMPANY, OF NEW YORK, N. Y.

COMPRESSION-BELT FOR COTTON-PRESSES.

SPECIFICATION forming part of Letters Patent No. 652,447, dated June 26, 1900.

Application filed November 21, 1898. Serial No. 696,972. (No model.)

*To all whom it may concern:*

Be it known that I, MAGNUS SWENSON, a citizen of the United States, residing at Chicago, in the county of Cook and State of Illinois, have invented certain new and useful Improvements in Compression-Belts for Cotton-Presses, of which the following is a specification.

In patents heretofore granted to me I have described certain improvements in cotton-presses wherein is employed an endless compression-belt passing over two baling-rolls mounted on each side of and in substantially the same horizontal plane with a core on which the bale is formed and beneath which the said belt is also extended. Compression on the forming bale is effected by one or more pressure-cylinders connected to the movable baling-roll and also by the tension of the belt produced by a relative slipping thereof upon and with respect to the baling-rolls. In constructing these presses in accordance with my invention I find that the endless belts referred to are capable of improvement. In case of belts made of alternating layers of a textile fabric and rubber I find that when the rubber side is arranged next to the forming bale the operation tends to wear off the rubber layer very quickly and disclose the subjacent layer of textile material, while, on the other hand, if the textile layer of the belt is arranged next to the forming bale, either intentionally or by the wearing away of the rubber surface, the said layer in a very short time assumes a calendered or extremely-smooth condition, tending to slip upon the cotton and failing to rotate the bale to accumulate the cotton bat or sheet thereon. Furthermore, with such compound or combination belts the passage of the belt around the comparatively-small core at the starting of the baling operation tends to loosen the layers of which the belt is formed, so that it becomes very soft and difficult to guide. While the objections I have pointed out are encountered particularly in connection with combination-belts, the same criticisms, to a very large extent, apply to other continuous or fiber belts as distinguished from those made of metal links.

It is the object of my invention to provide improvements in the compression-belts of these cotton-presses, which improvements are applicable either to combination-belts, which are well-known articles of manufacture, or to leather belts or belts of other fibers or fibrous materials. By means of my improvements the life of the belt will be very largely increased, the rubber surface is not worn, and hence the bale will at all times be effectively rotated, and in the case of a combination or compound belt the layers will be always tightly secured together, so that they cannot separate, with its attendant objections. Furthermore, by my present improvements I obtain a belt particularly adapted for use in a cotton-press, since it possesses great lateral stiffness, while at the same time its longitudinal flexibility is not interfered with.

In order that my invention may be easily understood, attention is called to the accompanying drawings, forming a part of this specification, and in which—

Figure 2:
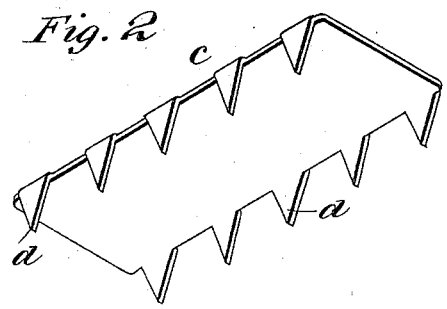

Figure 1 represents a plan view of a belt embodying my present improvement; Fig. 2, a perspective view of one of the protecting-plates detached; and Fig. 3, a section through one of the protection-plates, illustrating the invention applied to a combination or compound belt.

In all of the above views corresponding parts are represented by the same letters of reference.

Figure 3:
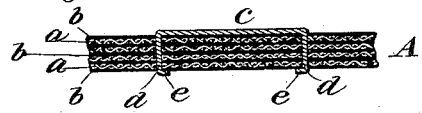

A represents a belt for use on a cotton-press, the said belt being endless and of a width equal, approximately, to the longitudinal dimension of the complete bale. In Fig. 3 I illustrate this belt as being composed of layers $a$ and $b$, generally of a textile material, such as cotton-duck, and rubber in alternation. Such belts are very strong and are more durable than any other belts with which I am familiar.

Carried on the working surface of the belt— *i. e.*, the surface which engages the bale—are a large number of metal shields or plates $c$, made preferably of sheet-steel. These plates are preferably oblong in plan and are arranged in substantially-transverse parallel lines, the plates of the lines being staggered, as shown, whereby the plates of one line coincide with the spaces between the plates of the adjacent lines. These plates are provided with a series of prongs $d$, as shown in Figs. 2 and 3, which are integral with each plate and are forced through the belt, being clenched on the under side thereof, as shown at $e$, so as to be held firmly in position. These plates are secured in place by any suitable form of apparatus. By providing a belt with these shields or plates I effectively protect the surface of the belt from wear, and, in fact, belts which I have used equipped with my present improvements have failed to show the slightest wear after continued and hard use. By arranging such shields in transverse parallel lines, as shown, the longitudinal flexibility of the belt is in no way interfered with, and the belt is free to pass easily over the baling-rolls, under the core, or around the bale. Furthermore, by arranging such shields in staggered lines, as explained, I secure a belt which in its transverse direction is substantially rigid, and hence it can not only be very easily guided upon the baling-rolls, but it will also effectively resist the buckling action produced by an uneven accumulation of cotton on the bale, as frequently occurs in practice. Furthermore, the use of these shields or plates on a compression-belt assists materially in the operation, since the forward edges of the plates engage with the cotton and serve to effectively rotate the bale.

Having now described my invention, what I claim as new, and desire to secure by Letters Patent, is as follows:

As a new article of manufacture, a compression-belt for a cotton-press, having on its working surface a series of metallic plates or shields arranged in transverse parallel lines, the plates in alternate lines being staggered, the spaces between the plates or shields of each line being of a less length than that of the plates, substantially as set forth.

This specification signed and witnessed this 17th day of November, 1898.

MAGNUS SWENSON.

Witnesses:
B. A. JOHNSTON,
E. FEWSON.